United States Patent [19]
Reising

[11] Patent Number: 4,916,188
[45] Date of Patent: Apr. 10, 1990

[54] FLUOROCARBON POWDER PAINTS

[75] Inventor: John C. Reising, Avon, Ohio

[73] Assignee: The Glidden Company, Cleveland, Ohio

[21] Appl. No.: 277,013

[22] Filed: Nov. 28, 1988

[51] Int. Cl.$^4$ .................. C08L 67/02; C08L 75/06
[52] U.S. Cl. .................. 525/124; 525/326.3; 524/507; 524/513; 524/523
[58] Field of Search .................. 525/326.3, 124, 125; 524/507, 513, 523

[56] References Cited

U.S. PATENT DOCUMENTS 4,046,727 9/1977 Itoh et al. .................. 525/326.3
4,404,320 9/1983 Goto et al. .................. 525/124
4,690,968 9/1987 Mitani et al. .................. 525/326.3
4,818,791 4/1989 Murakami et al. .................. 525/124

Primary Examiner—Joseph L. Schofer
Assistant Examiner—T. McDonald, Jr.
Attorney, Agent, or Firm—Thomas M. Schmitz

[57] ABSTRACT

Thermosetting powder paints are produced from functional fluorocarbon resins adapted to be coreactive with a blocked diisocyanate upon heating. Preferred compositions can further contain hydroxyl functional acrylic polymers or polyester polymers which can coreact with the unblocked diisocyanate upon heat curing of the powder paint film.

11 Claims, No Drawings

FLUOROCARBON POWDER PAINTS

BACKGROUND OF THE INVENTION

This invention pertains to paint coatings and particularly to powder paint coatings based on thermosetting polymeric binders comprising a functional fluorocarbon polymer adapted to be crosslinked with a blocked isocyanate crosslinking resin.

Fluorocarbon polymers dispersed in organic solvents are disclosed in U.S. Pat. No. 3,340,222 and U.S. Pat. No. 3,324,069 although such compositions require considerable amounts of organic solvent which cause undesirable solvent emission problems. Aqueous dispersed polyvinylidene fluoride polymers are disclosed in U.S. Pat. No. 4,022,737 and U.S. Pat. No. 3,770,685 and U.S. Pat. No. 3,679,618 while admixtures of aqueous polymers and acrylic polymers are disclosed in U.S. Pat. No. 4,141,873 and U.S. Pat. No. 4,383,075. However, dispersion of fluorocarbon polymers into water is difficult and paint films produced by polymeric admixture often produced non-uniform and non-homogenous paint films due to discrete particles of high Tg fluorocarbon polymer particles dispersed throughout the paint film which can cause premature failure of the paint film as pointed out in commonly assigned U.S. Pat. No. 4,383,075.

It now has been found that solid functional fluorocarbon copolymers alone or in combination with other functional polymers can be used as binder polymers useful in dry powder paint coatings substantially free of solvents and water. The functional fluorocarbon copolymers are coreactive with crosslinking components and particularly with blocked isocyanates to produce highly desirable thermosetting powder paints which provide protective surface paint films exhibiting considerably enhanced exterior durability as well as improved gloss retention and chalk resistance. Other film integrity properties such as mechanical resilience and salt spray resistance are improved or maintained in comparison to other high quality films based on conventional acrylic or polyester polymers for powder coatings. The use of functional fluorocarbon polymers in powder coatings further eliminates the dispersion problem in solvent or water dispersed coatings and further eliminates dispersion and powder processing difficulties encountered with the use of high Tg, high melt, thermoplastic fluoropolymers in powder coatings. These and other advantages of this invention will become more apparent by referring to the detailed description and illustrative examples.

SUMMARY OF THE INVENTION

Briefly, the invention pertains to powder paints and protective surface paint films thereof based on a thermosetting polymeric binder comprising a functional fluorocarbon copolymer and a coreactive blocked isocyanate compound adapted to crosslink the fluoropolymer upon heat curing the applied paint film. The composition comprises between 14 and 27 weight parts isocyanate crosslinker per 100 weight parts of functional fluorocarbon polymer.

DETAILED DESCRIPTION OF THE INVENTION

The powder paint of this invention is based on a thermosetting polymeric binder comprising a functionally reactive fluorocarbon copolymer adapted to be crosslinked with blocked isocyanate compound.

Referring first to functionally reactive fluorocarbon polymers, such polymer typically comprises copolymerized ethylenically unsaturated monomers containing carbon-to-carbon double bond unsaturation including minor amounts of hydroxylated vinyl monomers and major amounts of fluorocarbon monomers.

The preferred functionally reactive hydroxyl fluorocarbon polymer comprises a copolymer of a hydroxyalkyl vinyl ether and a fluorolefin such as tetra or trifluoroethylene. The most preferred reactive fluorocarbon polymers comprise a terpolymer of alkyl vinyl ether, hydroxalkyl vinyl ether, and a fluoroalkylene such as tetra- or trifluoroethylene. Copolymer chains are believed to be a blocked copolymer of alternating units of trifluoroethylene and vinyl ether with pendant side chain structures containing hydroxyl functionality due to the hydroxyalkyl vinyl ethers. Preferred fluorocarbon copolymers or terpolymers comprise by mole percent between 30% and 70% fluorolefin and between 30% and 70% vinyl ether units including hydroxyalkyl vinyl ether units. Preferred fluorolefins include tetrafluoroethylene, trifluoroethylene and chlorotrifluoroethylene. Preferred alkyl vinyl ethers include linear or branched chain aliphatic alkyls having from 2 to 8 carbon atoms such as methyl vinyl ether, ethyl vinyl ether, isopropyl vinyl ether, n-butyl vinyl ether, and similar lower alkyl vinyl ethers. Hydroxy alkyl-vinyl ethers are similar alkyl vinyl ethers containing a substituted hydroxyl group on the alkyl chain. Hydroxy vinyl ether units comprise between 1% and 30% by mole percent of the hydroxyl functional fluorocarbon polymer. The hydroxy value of the hydroxyl functional fluorocarbon polymer is between 2 and 200 and preferably between 5 and 150. Highly desirable hydroxyl fluorocarbons are terpolymers of alkyl vinyl ether, hydroxyalkyl ether, and trifluoroethylene copolymer sold commercially and known as Lumiflon Polymers. A particularly preferred Lumiflon Polymer is LF-200 D as described in European Patent Application 0 186 186.

The preferred hydroxyl functional fluorocarbon polymers contain copolymerized monomeric units comprising by molar percent between 30% and 70% and preferably between 45% and 48% fluorocarbon monomer, between 1% and 30% and preferably between 2% and 5% hydroxy alkyl vinyl ether monomer, with the balance being alkyl vinyl ether monomer. The functional fluorocarbon polymer is a solid at ambient temperatures and have a softening point or Tg above about 35° C. and preferably between 35° C. and 50° C. with a number average molecular weight between 8,000 and 16,000 and preferably between 10,000 and 14,000, as measured by GPC (gel permeation chromatography) ASTM D 3016-78, D 3536-76, and D 3593-80.

Referring next to the isocyanate crosslinking component, preferred isocyanates are blocked diisocyanates which become unblocked and activated under heat and at temperatures approximately above the melt temperature of the powder paint. Latent blocked isocyanate crosslinking agents useful in the preparation according to this invention are derived from a wide variety of isocyanates and/or mixtures thereof. These include, for example, isophorone diisocyanate; 2,4-tolylene diisocyanate; 2,6-tolylene diisocyanate; alkylene diisocyanates such as 1,4-tetramethylene-diisocyanate; 1,6-hexamethylene diisocyanate; 1,12-dodecane diisocyanate; cyclobutane and cyclohexane (1,3 and 1,4-) diisocyanates; phenylene diisocyanates (1,3- and 1,4-) and naphthalene-1,5-diisocyanate. Suitable blocking agents are those known in the art and include alcohols, phenol, ketoximes and the like. Especially preferred are 2-ethylhexyl alcohol and caprolactam. Preferred isocyanates include isophorone diisocyanate adduct with polyol such as trimethylolpropane and blocked with caprolactam and a urethdione linked isophorone diisocyanate known as Huls BF 1540. Non-blocked isocyanate being free from blocking agent and containing a urethdione linkage can be used in combination with a blocked isocyanate.

On a weight basis, the polymeric thermosetting binder of this invention comprises between about 14 and 27 weight parts of isocyanate crosslinker per 100 weight parts of functionally reactive fluorocarbon polymer.

In another aspect of this invention, the thermosetting polymeric binder composition can further contain a functionally reactive acrylic polymer containing hydroxyl functionality adapted to be coreactive with the blocked isocyanate crosslinker. Useful acrylic copolymers are produced by solvent or fusion polymerization of ethylenically unsaturated monomers containing carbon-to-carbon double bond unsaturation including acrylic monomers and hydroxyl functional monomers as well as other ethylenic monomers such as vinyl monomers, allylic monomers and acrylamide monomers. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohex as well as conjugated dienes such as 1,3 butadiene, methyl-2-butadiene, 1,3-piperylene, 2,3 dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxy alkyl acrylates and methacrylates such as hydroxyethyl and hydroxypropyl acrylates and methacrylates, as well as amino acrylates and methacrylates, and acrylic and methacrylic acid. Hydroxyl functional monomers include hydroxy alkyl acrylates such as 2-hydroxy ethyl acrylate and methacrylate, 2-hydroxy propyl acrylate and methacrylate, and similar hydroxy lower alkyl acrylates or methacrylates. On a weight basis, the hydroxyl functional acrylate copolymer comprises copolymerized monomers between 45% and 75% acrylic monomers, between 5% and 35% hydroxyl functional monomers, with the balance being other ethylenically unsaturated monomers. The acrylic polymer can be produced by bulk polymerization of ethylenically unsaturated monomers activated by peroxide or azo or other free radical initiator at polymerization temperatures typically between 70° C. to 170° C. and preferably between 120° C. to 150° C. Typically 0.5 to 2% peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred; azo initiators such as azo bisisobutyronitrile and dimethylazobisisobutyrate; as well as alkali metal persulfate or ammonium persulfates. Mercaptans can be added at levels of about 2% to 4% based on the weight of the monomers to provide copolymers of low molecular weight. Mercaptans useful in controlling molecular weight and primarily to produce low molecular weight polymers include for example 2-mercaptoethanol; 1-mercapto-2-propanol; and 2-hydroxyethyl-3-mercapto propionate. The number molecular weight of the acrylic copolymer can be between 3,000 and 10,000 as measured by GPC according to ASTM D 3016-72; D3536-76; and D3593-80. The Tg or softening point of the acrylic polymer should be at least 60° C. as calculated by the Fox equation based on the ratio of specific monomers. The hydroxyl number of the acrylic copolymer is between 30 and 150 as measured by mg KOH/g. In this aspect of the invention, the coating binder can contain between 20% and 86% functional fluorocarbon polymer between 0% and 60% (preferably above 1%) functionally reactive acrylic polymer, and between 10% and 40% isocyanate crosslinker on a weight basis.

A further aspect of this invention pertains to the inclusion of a hydroxyl functional, low molecular weight, linear polyester in combination with the hydroxyl functional fluorocarbon polymer and the blocked isocyanate. Suitable polyester polymers are produced from linear aliphatic type glycols esterified with considerable lesser molar amounts of aromatic dicarboxylic and tricarboxylic acid and linear saturated dicarboxylic acid having between 2 and 10 linear carbon atoms such as adipic, azelaic, succinic, glutaric, pimelic, suberic or sebacic acid. Preferred and commercially available linear saturated dicarboxylic acids are adipic or azelaic acid. Aromatic dicarboxylic acids (anhydrides) include phthalic, isophthalic, terephthalic, tetrahydrophthalic and tricarboxylic acids anhydrides including trimelletic anhydride. Suitable glycols include non-ether linear aliphatic glycols having 2 to 8 carbon atoms such as 1,3 or 1,4 butylene glycol, 1,6 hexane diol, neopentyl glycol, propylene glycol and similar linear glycols. Ether glycols include diethylene glycol and dipropylene glycol. The molar excess of the glycol over the lesser molar amounts of aromatic and linear saturated dicarboxylic acid is between about 10% and 80% and preferably between about 20% and 60%. On a molar basis, the preferred low molecular weight polyester polymer comprises between 0.1 and 0.5 moles of aromatic dicarboxylic acid and tricarboxylic acids and 0.5 and 0.1 moles of linear saturated dicarboxylic acid per 1 mole of glycol. Hence, the polyester contains considerable excess unreacted hydroxyl groups to provide a hydroxy polyester having a hydroxyl number between 20 and 320 and preferably between 40 and 80. Glycol can be esterified with minor amounts up to about 5% by weight of unsaturated dicarboxylic acids (anhydrides) including maleic, fumaric or itaconic acids; or monocarboxylic acids such as acetic, propyl-, and higher chain aliphatic acids up to about 8 carbon atoms. The number average molecular weight can be between 1,000 and 4,000 as measured by GPC.

The polyester can be produced by solvent or bulk polymerization although bulk polymerization is preferred. The raw materials can be charged in bulk and esterification polymerized at temperatures typically between 190° C. to 240° C. although moderately higher or lower temperatures can be utilized satisfactorily. An esterification catalyst can be used, typically at less than 1% levels based on charge, such as an organo tin compound. In this aspect of the invention, the coating binder can contain on a weight basis between 20% and 86% functional fluorocarbon polymer, between 0% and 60% (preferably above 1%) functionally reactive polyester polymer, and between 10% and 40% isocyanate crosslinker.

Paint coatings are used as surface protective coatings applied to substrates as a continuous film for the purpose of decorative appearance as well as protection of the substrate. Powder paint is applied to the substrate as dry powder and heated to melt the powder particles into a continuous paint film, which can be fused and thermoset under heat.

A powder paint coating ordinarily comprises an organic binder, pigments, and various additives. The polymeric binder, which is thermosetting, acts as a dispersant for the pigments and functions as a binder for the pigments in the cured or hardened paint film. The binder imparts rheological properties to the paint coating and provides adhesion of the paint film to the substrate. The pigments may be organic or inorganic and functionally contribute to opacity and color in addition to durability and hardness, although some powder paint coatings contain little or no opacifying pigments and are desribed as clear coatings. Pigments ordinarily can include opacifying pigments such as titanium dioxide, zinc oxide, leaded zinc oxide, as well as tinting pigments such as carbon black, yellow oxides, brown oxides, tan oxides, raw and burnt sienna or umber, chromium oxide green, phthalocyanine green, phthalonirile blue, ultramarine blue, cadmium pigments, chromium pigments, and the like. Filler pigments such as clay, silica, talc, mica, wollastonite, wood flower and the like can be added. Up to about six weight parts and typically between about 3.5 and 4 weight parts of pigment can be combined with one weight part of polymeric binder depending on the adsorbtion properties of the pigment particles. Pigmented powder coatings typically comprise a pigment to binder ratio of about 1 to 1.

To produce powder coatings, the raw batch ingredients can be thoroughly mixed in a high intensity mixer such as a frustroconical agitator whereby the materials are discharged in a uniform mixture. The high intensity mixer discharges the batch components to a heated screw extruder wherein the extruder is internally heated. The exit extruder temperature is regulated according to the type of powder paint being produced but generally is between about 90° and 150° C. at the heated exit die of the screw fed extruder. The extrudate emergers from the extruder as a ribbon of less than about 1/16 inch thickness which passes onto a water cooled stainless steel conveyor belt whereby the plastic ribbon extrudate fully hardens. The cooled extrudate then passes through a mechanical commuter disposed at the end of the cooled stainless steel belt to efficiently break the fragile brittle ribbon into very small flakes. The small flakes are then discharged onto a cooled mill, such as a hammer mill, to grind the small particles onto powder paint of less than 325 mesh and preferably passing a 200 mesh U.S. Standard sieve screen whereupon the powder can be further classified into particle size if desired.

The merits of this invention are further illustrated by the following examples wherein parts are by weight and temperatures are in °C. unless otherwise indicated.

EXAMPLE 1

Powder paints were made in the following manner to produce the compositions in Table 1.

Solid particles of hydroxyl functional acrylic or polyester polymer (where added) and the OH functional fluorocarbon resin were dry blended together with blocked diisocyanate to produce the coreactive organic polymeric binder component of the powder paint to this invention. The binder blend or individual dry components thereof can be thoroughly and uniformly mixed with raw batch ingredients by homogenizing the binder, pigmentary solids, plasticizers and other components to uniformly blend the resinous binder with the pigmentary solids. Pigments can ordinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber, chromium oxide green, phthalocyanine green, phthalonirile blue, ultramarine blue, cadmium pigments, chromium pigments, and the like. Filler pigments such as clay, silica, talc, mica woolastonite, wood flower and the like can be added. The raw batch ingredients can be thoroughly mixed in a high intensity mixer such as a frustroconical agitator whereby the materials are discharged in a uniform mixture. The high intensity mixer discharges the batch components to a heated screw extruder. The extrudate emergers from the extruder as a ribbon of less than about 1/16 inch thickness which passes onto a water cooled stainless steel conveyor belt whereby the plastic ribbon extrudate fully hardens. The cooled extrudate then passes through a mechanical commuter discharged at the end of the cooled stainless steel belt to efficiently break the fragile brittle ribbon into very small flakes. The small flakes are then discharged onto a cooled mill, such as a hammer mill, to grind the small particles onto powder paint of less than 325 mesh and preferably passing a 200 mesh U.S. Standard sieve screen whereupon the powder can be further classified into particle size if desired.

A. Weigh-Up—All ingredients in Examples 2–8 weighed to plus or minus 0.1 gram.
B. Premix Blending—Welex High Intensity Laboratory Mixer Model 20M; Mixing time 1 to 2 minutes at 1800 RPM.
C. Meltmix Extrusion—Buss Extruder/Kneader Model #PR-46

| | | | |
|---|---|---|---|
| Barrel Temp. | 110° C. | Feeder Setting | 6–8 |
| Screw Temp. | 32° C. | Extruder Load | 4–5 Amps |
| Die Temp | 32° C. | Extruder Output | 30–40 Kg/Hr. |
| Screw Speed | 100 rpm | Post-Die Processing | Chill Rolls |

D. Grinding—Micro Pulverizer Type CF; 0.1 Oval Screen 14,000 rpm. Liquid Nitrogen.
E. Sieving—Azo Rotary Sieve Cyclone Screener Model E240-B1; −140 Mesh Screen.

TABLE 1

|  | Ex. 2 VPE6158 STD | Ex. 3 50/VPE6158 50/LF200 | Ex. 4 SCX800B STD | Ex. 5 75/SCX800B 25/LF200 | Ex. 6 50/SCX800B 50/LF200 | Ex. 7 25/SCX800B 75/LF200 | Ex. 8 100% LF200 |
|---|---|---|---|---|---|---|---|
| Hydroxyl Polyester VPE 6158[1] | 50–54 | 25–27 | — | — | — | — | — |
| IPDI Curing Agent[2] | 8–10 | 8–10 | 10–14 | 10–12 | 8–10 | 8–10 | 7–9 |
| LF200 Resin[3] | — | 25–27 | — | 12–14 | 25–27 | 37–39 | 52–54 |
| Johnson SCX800B Resin[4] hydroxyl acrylic | — | — | 48–50 | 36–38 | 23–25 | 10–12 | — |
| TiO$_2$ White Pigment Dupont R960 | 36–38 | 36–38 | 36–38 | 36–38 | 36–38 | 36–38 | 36–38 |
| Benzoin Outgas Agent | .3–.5 | .3–.5 | .3–.5 | .3–.5 | .3–.5 | .3–.5 | .3–.5 |
| Resiflow Flow Agent PL200[5] | .5–.7 | .5–.7 | .5–.7 | .5–.7 | .5–.7 | .5–.7 | .5–.7 |

[1]Goodyear VPE 6158 - Composition: Copolymer of 40% neopentyl glycol, 55% terephthalic acid and 5% trimellitic anhydride.
[2]Cargill P2400 Composition: E-caprolactam blocked copolymer of trimethanol propane and isophorone diisocyanate.
[3]Asahi Glass Co. LF200
[4]Johnson SCX800B - Composition: Copolymer of 30% methyl methacrylate, 20% butyl acrylate, 20% styrene, 10% 2 HEMA, 6% methyl acrylate, 2% methacrylic acid.
[5]Resiflow PL200 Composition: Copolymer of 2-hexyl, ethyl acrylate and butyl acrylate.

Test panels of the above composition in Table 1 were prepared in the following manner:
Test Panels: Cold rolled steel, 24 ga.; Bonderite 1000-iron phosphate pretreatment.
Bake: 20'@380° F. electric oven. Film Build: 2.0+0.2 mils DFT
Pigmentation: TiO$_2$; PVC=15% P/B=0.6

|  | WOM ASTM G-23 % 60° Gloss Retained | | | QUV ASTM D4329 % 60° Gloss Retained | | | |
|---|---|---|---|---|---|---|---|
|  | 1200 Hrs. | 2800 Hrs. | 4000 Hrs. | 1200 Hrs. | 3800 Hrs. | 4500 Hrs. | 5000 Hrs. |
| Ex. 2 | 20 | 12 | 10 | 11 | 8 | — | — |
| Ex. 3 | 55 | 32 | 28 | 37 | 42 | — | — |
| Ex. 4 | 65 | 13 | 13 | 63 | 26 | 14 | 11 |
| Ex. 5 | 77 | 22 | 17 | 79 | 33 | 23 | 19 |
| Ex. 6 | 100 | 72 | 52 | 91 | 56 | 50 | 52 |
| Ex. 7 | 100 | 77 | 65 | 96 | 68 | 58 | 54 |
| Ex. 8 | 100 | 100 | 100 | 100 | 100 | 98 | 92 |

In addition to improved gloss retention, increasing levels of LF200 (identify) improved chalk resistance markedly. The 100% LF200 system exhibits no chalk tape-off after 5000 hours QUV and 4000 hours WOM. The above systems represent a novel method of weatherability enhancement and other improved film properties in thermoset powder coatings.

I claim:

1. A powder plant coating composition substantially free of organic solvent and water, the paint coating composition containing a thermosetting polymeric binder, comprising:
   a hydroxyl functional fluorocarbon copolymer of copolymerized monomers comprising hydroxy alkyl vinyl ether and fluorolefin, where the fluorocarbon copolymer contains between 1% and 30% mole percent hydroxy alkyl vinyl ether, said fluorocarbon polymer produced by copolymerizing said monomers in the absence of water;
   blocked diisocyanate where the blocked diisocyanate is adapted to coreact and crosslink with said functional fluorocarbon copolymer upon heat curing the paint coating;
   functionally reactive hydroxyl acrylic copolymer or hydroxyl polyester polymer adapted to coreact with the blocked isocyanate, and said binder comprises on a weight basis between 20% and 86% functional fluorocarbon polymer, between 0% and 60% functionally reactive hydroxyl acrylic polymer or hydroxyl functional polyester polymer, and between 10% and 40% said blocked diisocyanate crosslinker.

2. The paint coating composition in claim 1 where the hydroxy functional fluorocarbon copolymer comprises on mole percent basis between 30% and 70% fluorolefin, between 1% and 30% hydroxy alkyl vinyl ether, with the balance being alkyl vinyl ether.

3. The paint coating composition in claim 2 where the alkyl groups on both the alkyl vinyl ether and the hydroxy alkyl vinyl ether contain between 2 and 8 carbon atoms.

4. The paint coating composition in claim 2 where the hydroxy functional fluorocarbon comprises between 2% and 5% hydroxy alkyl vinyl ether, between 45% and 48% fluorocarbon monomer, with the balance being alkyl vinyl ether.

5. The paint coating composition in claim 1 where the fluorocarbon copolymer has a number average molecular weight between about 8,000 and 16,000 as measured by GPC.

6. The paint coating composition in claim 2 where the coating is a dry powder having a Tg above about 35° C.

7. The paint coating composition in claim 6 where the blocked diisocyanate is adapted to unblock above the powder Tg and coreact with said functional fluorocarbon.

8. The paint coating composition in claim 2 where the blocked diisocyanate is a polyol blocked with caprolactam.

9. The paint coating composition in claim 2 where the blocked diisocyanate comprises blocked trimethylolpropane.

10. The paint coating composition in claim 2 where the blocked isocyanate is blocked with acetone oxime.

11. The coating composition in claim 1 where the polyester polymer is a low molecular weight linear polymer having a number average molecular weight between 2,000 and 3,000.

* * * * *